(12) United States Patent
Cordeiro

(10) Patent No.: US 10,027,452 B2
(45) Date of Patent: *Jul. 17, 2018

(54) DEVICE, SYSTEM AND METHOD OF TRANSFERRING A WIRELESS COMMUNICATION SESSION BETWEEN WIRELESS COMMUNICATION FREQUENCY BANDS

(71) Applicant: Intel Corporation, Santa Clara, CA (US)

(72) Inventor: Carlos Cordeiro, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 134 days.

This patent is subject to a terminal disclaimer.

(21) Appl. No.: 13/913,609

(22) Filed: Jun. 10, 2013

(65) Prior Publication Data

US 2013/0336248 A1  Dec. 19, 2013

Related U.S. Application Data

(63) Continuation of application No. 12/551,614, filed on Sep. 1, 2009, now Pat. No. 8,644,772.

(51) Int. Cl.
*H04L 5/00* (2006.01)
*H04W 36/06* (2009.01)
*H04W 76/00* (2018.01)
*H04B 7/12* (2006.01)

(52) U.S. Cl.
CPC .............. *H04L 5/003* (2013.01); *H04B 7/12* (2013.01); *H04W 36/06* (2013.01); *H04W 76/00* (2013.01)

(58) Field of Classification Search
None
See application file for complete search history.

(56) References Cited

U.S. PATENT DOCUMENTS 6,721,562 B2    4/2004  Kelley
8,155,040 B2    4/2012  Franklin et al.
8,644,772 B2 *  2/2014  Cordeiro ............... H04W 36/06
                                                       455/73

(Continued)

FOREIGN PATENT DOCUMENTS

CN    1710988    12/2005
CN    1736114     2/2006

(Continued)

OTHER PUBLICATIONS

Office Action received for Japanese Patent Application No. 2014-135557, dated Feb. 17, 2015, 3 pages of Japanese Office Action and 3 pages of English Translation.

(Continued)

*Primary Examiner* — Chirag Shah
*Assistant Examiner* — Amar Persaud
(74) *Attorney, Agent, or Firm* — Hanley, Flight & Zimmerman, LLC

(57) ABSTRACT

Some demonstrative embodiments include coordinating a session transfer between first and second multi-band wireless communication devices capable of communicating over at least first and second wireless communication frequency bands, wherein at least one device uses the same medium access control (MAC) address in both the first and second wireless communication frequency bands.

16 Claims, 3 Drawing Sheets

(56) References Cited

U.S. PATENT DOCUMENTS

| | | | |
|---|---|---|---|
| 9,007,968 B2 | 4/2015 | Singh et al. | |
| 9,084,260 B2* | 7/2015 | Maltsev | H04W 72/0453 |
| 9,525,525 B2 | 12/2016 | Cordeiro | |
| 2003/0148764 A1 | 8/2003 | Kelley | |
| 2005/0118985 A1* | 6/2005 | Takabatake | H04W 28/22 455/411 |
| 2005/0195858 A1 | 9/2005 | Nishibayashi et al. | |
| 2005/0281227 A1 | 12/2005 | Vedder et al. | |
| 2006/0034219 A1 | 2/2006 | Gu et al. | |
| 2006/0073827 A1 | 4/2006 | Vaisanen et al. | |
| 2006/0223574 A1 | 10/2006 | Chandra | |
| 2006/0251119 A1 | 11/2006 | Ramesh | |
| 2007/0030823 A1 | 2/2007 | Guo et al. | |
| 2007/0091988 A1* | 4/2007 | Sadri | H04B 1/0057 375/219 |
| 2007/0135162 A1 | 6/2007 | Banerjea et al. | |
| 2007/0160017 A1 | 7/2007 | Meier et al. | |
| 2008/0039066 A1 | 2/2008 | Laroia et al. | |
| 2008/0151835 A1* | 6/2008 | Kneckt | H04W 36/02 370/331 |
| 2008/0239957 A1 | 10/2008 | Tokura et al. | |
| 2008/0298333 A1 | 12/2008 | Seok | |
| 2008/0320354 A1 | 12/2008 | Doppler et al. | |
| 2009/0088089 A1 | 4/2009 | Chandra et al. | |
| 2009/0221287 A1 | 9/2009 | Balasubramanian et al. | |
| 2010/0074190 A1 | 3/2010 | Cordeiro et al. | |
| 2010/0103885 A1 | 4/2010 | Cordeiro et al. | |
| 2010/0115174 A1* | 5/2010 | Akyol | G06F 13/385 710/316 |
| 2010/0315954 A1* | 12/2010 | Singh et al. | 370/241 |
| 2011/0053521 A1 | 3/2011 | Cordeiro | |
| 2011/0261735 A1 | 10/2011 | Cordeiro | |
| 2011/0261754 A1 | 10/2011 | Trainin | |
| 2011/0261755 A1 | 10/2011 | Cordeiro et al. | |
| 2011/0286369 A1* | 11/2011 | Kosaka | H04W 56/002 370/280 |
| 2012/0106452 A1 | 5/2012 | Kneckt et al. | |
| 2012/0182954 A1 | 7/2012 | Cordeiro et al. | |
| 2012/0243474 A1* | 9/2012 | Iyer | H04L 63/1466 370/328 |
| 2013/0163578 A1* | 6/2013 | Zuniga | H04B 1/7183 370/350 |
| 2014/0030985 A1 | 1/2014 | Cordeiro | |
| 2014/0192656 A1* | 7/2014 | Chandramouli et al. | 370/241 |
| 2015/0026453 A1* | 1/2015 | Liu | H04W 12/04 713/151 |
| 2015/0063213 A1 | 3/2015 | Laroia et al. | |
| 2015/0180547 A1* | 6/2015 | Gormley et al. | H04B 5/0031 |

FOREIGN PATENT DOCUMENTS

| | | |
|---|---|---|
| CN | 2930123 | 8/2007 |
| CN | 101272309 | 9/2008 |
| CN | 101455034 | 6/2009 |
| CN | 101500274 | 8/2009 |
| EP | 1608189 | 12/2005 |
| JP | 2002-335201 A | 11/2002 |
| JP | 2003-244159 A | 8/2003 |
| JP | 2006-054884 A | 2/2006 |
| JP | 2008-167285 A | 7/2008 |
| JP | 2008-538272 A | 10/2008 |
| JP | 2009-518963 A | 5/2009 |
| JP | 2009-206848 A | 9/2009 |
| JP | 2009-284422 A | 12/2009 |
| JP | 2012-503944 A | 2/2012 |
| KR | 10-2007-0043346 A | 4/2007 |
| KR | 10-2007-0120022 A | 12/2007 |
| KR | 10-0819705 B1 | 4/2008 |
| WO | 03067903 | 8/2003 |
| WO | 2006/080749 A1 | 8/2006 |
| WO | 2006/085194 A1 | 8/2006 |
| WO | 2006/107886 A2 | 10/2006 |
| WO | 2009/031659 A1 | 12/2009 |
| WO | 2010/022256 A2 | 2/2010 |
| WO | 2010/036595 A2 | 4/2010 |
| WO | 2011/005567 A2 | 1/2011 |
| WO | 2011/028340 A2 | 3/2011 |
| WO | 2011/028340 A3 | 6/2011 |

OTHER PUBLICATIONS

Office Action received for Japanese Patent Application No. 2014-135559, dated Mar. 31, 2015, 3 pages of Japanese Office Action and 2 pages of English Translation.

Office Action received for Japanese Patent Application No. 2012-527879, dated May 14, 2013, 3 pages of Japanese Office Action and 3 pages of English Translation.

Cordeiro et al., "PHY/MAC Complete Proposal to TGad, IEEE 802.11 Contribution", IEEE 802.11-10/0432r2, published in May 2010.

Kakani et al., "Fast Session Transfer NT, IEEE 802.11 Contribution", IEEE 802.11-10/0436r2, published on May 18, 2010.

Office Action received for Chinese Patent Application No. 201010287221.3, dated Nov. 26, 2013, 5 pages of Chinese Office Action and 7 pages of English Translation.

European Search Report received for European Patent Application No. 10814126.8 dated Dec. 18, 2014, 7 pages of Extended Search Report.

European Search Report received for European Patent Application No. EP14164627.3 dated Dec. 22, 2014, 7 pages of Extended Search Report.

European Search Report received for European Patent Application No. 14164629.9 dated Jan. 7, 2015, 7 pages of Extended Search Report.

Eldad Perahia et al., "IEEE 802.11 ad: Defining the Next Generation Multi-Gbps Wi-Fi", IEEE CCNC 2010 proceedings, 5 pages.

International Search Report and Written Opinion received for PCT Patent Application No. PCT/US2011/031090, dated Nov. 22, 2011, 8 pages.

International Search Report and Written Opinion received for PCT Patent Application No. PCT/US2011/033878, dated Dec. 15, 2011, 9 pages.

International Search Report and Written Opinion received for PCT Patent Application No. PCT/US2011/033886, dated Dec. 15, 2011, 9 pages.

Office Action Received for Japanese Patent Application No. 2011-090681, dated Sep. 25, 2012, 6 pages of Office Action including 3 pages of English Translation.

Office Action Received for Japanese Patent Application No. 2011-088260, dated Sep. 25, 2012, 8 pages of Office Action including 4 pages of English Translation.

Office Action received for Japanese Patent Application No. 2011-084836, dated Oct. 2, 2012, 4 pages of Office Action including 2 pages of English Translation.

International Preliminary Report on Patentability for PCT/US2011/033878 dated Nov. 8, 2012; 6 pages.

International Preliminary Report on Patentability for PCT/US2011/031090 dated Nov. 8, 2012; 5 pages.

International Preliminary Report on Patentability for PCT/US2011/033886 dated Nov. 8, 2012; 6 pages.

International Preliminary Report on Patentability for PCT/US2010/043846 dated Mar. 15, 2012.

International Search Report and Written Opinion Received for PCT Application No. PCT/US2010/043846, dated Apr. 29, 2011, 8 pages.

Carlos et al. "Methods for Multi-Band Wireless Communication and Bandwidth Management", U.S. Appl. No. 12/284,951, filed Sep. 25, 2008.

IEEE Std 802.11, IEEE Standard for Information technology—Telecommunications and information exchange between systems—Local and metropolitan area networks—Specific requirements, Part 11: Wireless LAN Medium Access Control (MAC) and Physical Layer (PHY) Specifications—Jun. 2007, pp. 1-1184.

Office Action received for Chinese Patent Application No. 201010287221.3, dated Mar. 5, 2013, 8 pages of Chinese Office Action and 13 pages of English Translation.

(56) References Cited

OTHER PUBLICATIONS

European Patent Office, "Communication Pursuant to Article 94(3) EPC," issued in connection with European Patent Application No. 10814126.8, dated Nov. 16, 2016 (4 pages).
State Intellectual Property Office of P.R. China, "First Office Action," issued in connection with Chinese Patent Application No. 201310573702.4, dated Dec. 2, 2015 (17 pages).
United States Patent and Trademark Office, "Non-Final Office Action," issued in connection with U.S. Appl. No. 14/046,342, dated Mar. 1, 2016 (23 pages).
United States Patent and Trademark Office, "Non-Final Office Action," issued in connection with U.S. Appl. No. 14/045,575, dated Feb. 26, 2016 (25 pages).
State Intellectual Property Office of P.R. China, "Second Office Action," issued in connection with Chinese Patent Application No. 201310573702.4, dated Sep. 9, 2016 (10 pages).
United States Patent and Trademark Office, "Notice of Allowance," issued in connection with U.S. Appl. No. 14/046,342, dated Aug. 10, 2016 (8 pages).
United States Patent and Trademark Office, "Final Office Action," issued in connection with U.S. Appl. No. 14/045,575, dated Jul. 18, 2016 (19 pages).
State Intellectual Property Office of P.R. China, "Office Action," issued in connection with Chinese Patent Application No. 201310575008.6, dated Apr. 11, 2016 (9 pages).
European Patent Office, "Communication Pursuant to Rules 70(2) and 70a(2) EPC," issued in connection with European Patent Application No. 10814126.8, dated Jan. 12, 2015 (1 page).
State Intellectual Property Office of P.R. China, "Notification to Grant Patent Right for Invention," Issued in connection with Chinese Patent Application No. 201010287221.3, dated Jun. 19, 2014 (4 pages).
United States Patent and Trademark Office, "Non-Final Office Action," issued in connection with U.S. Appl. No. 12/551,614, dated Apr. 11, 2012 (15 pages).
United States Patent and Trademark Office, "Non-Final Office Action," issued in connection with U.S. Appl. No. 12/551,614, dated Oct. 18, 2012 (14 pages).
United States Patent and Trademark Office, "Notice of Allowance," issued in connection with U.S. Appl. No. 12/551,614, dated May 20, 2013 (12 pages).
United States Patent and Trademark Office, "Notice of Allowance," issued in connection with U.S. Appl. No. 12/551,614, dated Sep. 30, 2013 (13 pages).
State Intellectual Property Office of P.R. China, "Third Office Action," issued in connection with Chinese Patent Application No. 201310573702.4, dated Jan. 19, 2017 (7 pages).
United States Patent and Trademark Office, "Non-Final Office action", issued in connection with U.S. Appl. No. 14/045,575, dated May 17, 2017, 93 pages.
State Intellectual Property Office of P.R. China, "Second Office Action," issued in connection with Chinese Patent Application No. 201310575008.6, dated Feb. 24, 2017 (7 pages).
European Patent Office, "Decision to Grant", issued in connection with European Patent application No. 14164627.3, dated Sep. 28, 2017, 2 pages.
European Patent Office, "Decision to Grant", issued in connection with European Patent application No. 14164629.9, dated Oct. 26, 2017, 2 pages.
United States Patent and Trademark Office, "Final Office Action," issued in connection with U.S. Appl. No. 14/045,575, dated Nov. 29, 2017 (32 pages).
European Patent Office, "Communication Pursuant to Article 94(3) EPC," issued in connection with European Patent Application No. 10 814 126.8, dated Apr. 9, 2018, 4 pages.

\* cited by examiner

US 10,027,452 B2

DEVICE, SYSTEM AND METHOD OF TRANSFERRING A WIRELESS COMMUNICATION SESSION BETWEEN WIRELESS COMMUNICATION FREQUENCY BANDS

CROSS REFERENCE TO RELATED DOCUMENTS

This application is a continuation of U.S. patent application Ser. No. 12/551,614, filed Sep. 1, 2009, and claims priority to that filing date for all applicable subject matter.

BACKGROUND

Wireless communication over Extremely high frequency (EHF) communication bands (mmwave frequency bands), e.g., of between 30 Gigahertz (GHz) and 300 GHz, may provide relatively high throughputs. However communication link over the mmwave frequency band may be less robust than a communication link operating over a lower frequency band, e.g., a 2.4 GHz or 5 GHz ("2.4/5 GHz") frequency band, for example, due to oxygen absorption.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

Figure 1:
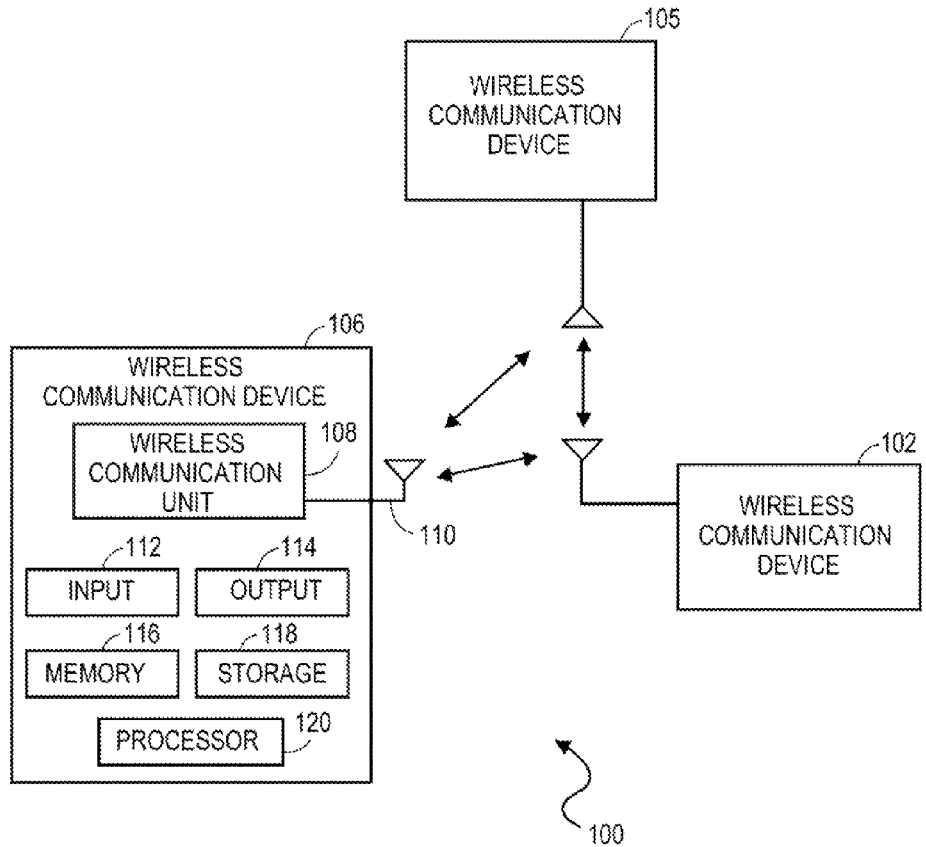
FIG. 1 is a schematic block diagram illustration of a system in accordance with some demonstrative embodiments.

In the allowing detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing," "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality" as used herein include, for example, "multiple" or "two or more". For example, "a plurality of items" includes two or more items.

Some embodiments may be used in conjunction with various devices and systems, for example, a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device a wireless Access Point (AP), a wired or wireless router, a wired or wireless modem, a video device, an audio device, an audio-video (A/V) device, a Set-Top-Box (STB), a Blu-ray disc (BD) player, a BD recorder, a Digital Video Disc (DVD) player, a High Definition (HD) DVD player, a DVD recorder, a HD DVD recorder, a Personal Video Recorder (PVR), a broadcast HD receiver, a video source, an audio source, a video sink, an audio sink, a stereo tuner, a broadcast radio receiver, a flat panel display, a Personal Media Player (PMP), a digital video camera (DVC), a digital audio player, a speaker, an audio receiver, an audio amplifier, a gaming device, a data source, a data sink, a Digital Still camera (DSC), a wired or wireless network, a wireless area network, a Wireless Video Area Network (WVAN), a Local Area Network (LAN), a Wireless LAN (WLAN), a Personal Area Network (PAN), a Wireless PAN (WPAN), devices and/or networks operating in accordance with existing IEEE 802.11 (IEEE 802.11-1999: *Wireless LAN Medium Access Control (MAC) and Physical Layer (PHY) Specifications*), 802.11a, 802.11b, 802.11g, 802.11b, 802.11j, 802.11n, 802.11 task group ad (TGad), 802.16, 802.16d, 802.16e, 802.16f, standards and/or future versions and/or derivatives thereof, devices and/or networks operating in accordance with existing Wireless-Gigabit-Alliance (WGA) and/or WirelessHD™ specifications and/or future versions and/or derivatives thereof, units and/or devices which are part of the above networks, one way and/or two-way radio communication systems, cellular radio-telephone communication systems, a cellular telephone, a wireless telephone, a Personal Communication Systems (PCS) device, a PDA device which incorporates a wireless communication device, a mobile or portable Global Positioning System (OPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device (e.g., BlackBerry, Palm Treo), a Wireless Application Protocol (WAP) device, or the like.

Some embodiments may be used in conjunction with one or more types of wireless communication signals and/or systems, for example, Radio Frequency (RF), Infra Red (IR), Frequency-Division Multiplexing (FDM), Orthogonal EDM (OFDM), Time-Division Multiplexing (TDM), Time-Division Multiple Access (TDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wi-Fi, Wi-Max ZigBee™, Ultra-Wideband (UWB), Global System for Mobile communication (GSM), 2G, 2.5G, 3G, 3.5G. Enhanced Data rates for GSM Evolution (EDGE) or the like. Other embodiments may be used in various other devices, systems and/or networks.

The term "wireless device" as used herein includes, for example, a device capable of wireless communication, a communication device capable of wireless communication, a communication station capable of wireless communication, a portable or non-portable device capable of wireless communication, or the like. In some demonstrative embodiments, a wireless device may be or may include a peripheral that is integrated with a computer, or a peripheral that is attached to a computer. In some demonstrative embodiments, the term "wireless device" may optionally include a wireless service.

Some demonstrative embodiments may be used in conjunction with suitable limited-range or short-range wireless communication networks, for example, a WLAN, a "piconet", a WPAN, a WVAN and the like.

Some demonstrative embodiments are described herein with reference to a frequency band of 60 GHz. However, other embodiments may be implemented utilizing any other suitable wireless communication frequency bands, for example, an Extremely High Frequency (EHF) band (the millimeter wave (mmwave) frequency band), e.g., a frequency band within the frequency band of between 30 Ghz and 300 GHZ, a WLAN frequency band, a WPAN frequency band, a frequency band according to the IEEE 802.11, IEEE 802.11TGad and/or WGA specifications, and the like.

Reference is now made to FIG. 1, which schematically illustrates a block diagram of a system 100 in accordance with some demonstrative embodiments.

As shown in FIG. 1, in some demonstrative embodiments, system 100 may include a wireless area network including one or more wireless communication devices, e.g., wireless communication devices 102, 105 and/or 106, capable of communicating content, data, information and/or signals over one or more suitable wireless communication links, for example, a radio channel, an IR channel, a RF channel, a Wireless Fidelity (WiFi) channel, and the like. One or more elements of system 100 may optionally be capable of communicating over any suitable wired communication links.

In some demonstrative embodiments, wireless communication devices 102, 105 and/or 106 may include, for example, a PC, a desktop computer, a mobile computer, a laptop computer, a notebook computer, a tablet computer, a server computer, a handheld computer, a handheld device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a cellular telephone, a PCS device, a PDA device which incorporates a wireless communication device, a mobile or portable GPS device, a DVB device, a relatively small computing device, a non-desktop computer, a "Carry Small Live Large" (CSLL) device, an Ultra Mobile Device (UND), an Ultra Mobile PC (UMPC), a Mobile Internet Device (MID), an "Origami" device or computing device, a device that supports Dynamically Composable Computing (DCC), a context-aware device, a video device, an audio device, an A/V device, a STB, a BD player, a BD recorder, a DVD player, a HD DVD player, a DVD recorder, a HD DVD recorder, a PVR, a broadcast HD receiver, a video source, an audio source, a video sink, an audio sink, a stereo tuner, a broadcast radio receiver, a flat panel display, a PMP, DVC, a digital audio player, a speaker, an audio receiver, a gaming device, an audio amplifier, a data source, a data sink, a DSC, a media player, a Smartphone, a television, a music player, or the like.

In some demonstrative embodiments, wireless communication devices 102, 105 and/or 106 may include a wireless communication unit 108 to perform wireless communication with wireless communication devices 102, 105, 106 and/or with one or more other wireless communication devices, e.g., as described below. Wireless communication devices 102, 105 and/or 106 may also include, for example, one or more of a processor 120, an input unit 112, an output unit 114, a memory unit 118, and a storage unit 116. Wireless communication devices 102, 105 and/or 106 may optionally include other suitable hardware components and/or software components. In some demonstrative embodiments, some or all of the components of one or more of wireless communication devices 102, 105 and/or 106 may be enclosed in a common housing or packaging, and may be interconnected or operably associated using one or more wired or wireless links. In other embodiments, components of one or more of wireless communication devices 102, 105 and/or 106 may be distributed among multiple or separate devices.

Processor 120 includes, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multi-purpose or specific processor or controller. Processor 120 executes instructions, for example, of an Operating System (OS) of wireless communication device 106, and/or of one or more suitable applications.

Input unit 112 includes, for example, a keyboard, a keypad, a mouse, a touch-pad, a track-ball, a stylus, a microphone, or other suitable pointing device or input device. Output unit 114 includes, for example, a monitor, a screen, a flat panel display, a Cathode Ray Tube (CRT) display unit, at Liquid Crystal Display (LCD) display unit, a plasma display unit, one or more audio speakers or earphones, or other suitable output devices.

Memory unit 118 includes, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage unit 116 includes, for example, a hard disk drive, a floppy disk drive, a Compact Disk (CD) drive, a CD-ROM drive, a DVD drive, or other suitable removable or non-removable storage units. Memory unit 118 and/or storage unit 116, for example, may store data processed by wireless communication device 106.

In some demonstrative embodiments, wireless communication unit 108 includes, for example, one or more wireless transmitters, receivers and/or transceivers able to send and/or receive wireless communication signals, RF signals, frames, blocks, transmission streams, packets, messages, data items, and/or data. For example, wireless communication unit 108 may include or may be implemented as part of a wireless Network Interface Card (NIC), and the like.

Wireless communication unit 108 may include, or may be associated with, one or more antennas or one or more sets of antennas 110. Antennas 110 may include, for example, an internal and/or external RF antenna, a dipole antenna, a monopole antenna, an omni-directional antenna, an end fed antenna, a circularly polarized antenna, a micro-strip antenna, a diversity antenna, or other type of antenna suitable for transmitting and/or receiving wireless communication signals, blocks, frames, transmission streams, packets, messages and/or data.

In some demonstrative embodiments, system 100 may perform the functionality of a multi-band wireless communication network. For example, wireless communication devices 102, 105 and/or 106 may include multi-band wireless communication devices capable of communicating over two or more wireless communication frequency bands. For example, wireless communication unit 108 may include a multi-band wireless communication unit capable of communicating over two or more wireless communication frequency bands, for example, the mmwave frequency band, the 60 GHz frequency band, and the 2.4/5 GHz frequency band.

In some demonstrative embodiments, device 106 may be capable of communicating with wireless communication devices 102, 105 and/or other wireless communication devices over a first wireless communication frequency band, e.g., the 60 GHz frequency band; and communicating with wireless communication devices 102, 105 and/or other wireless communication devices over a second wireless communication frequency band e.g., the 2.4/5 GHz frequency band.

In some demonstrative embodiments, wireless communication device 105 may perform the functionality of a suitable Access Point (AP) and Wireless communication devices 102, 106 and/or any other wireless communication device of system 100 may perform the functionality of a non-AP station, e.g., in accordance with the IEEE 802.11 specification. According to this embodiment, wireless communication devices 102, 105 and/or 106 may form a Basic-Service-Set (BSS), and device 105 may be capable of managing communication between wireless communication devices 102 and 106 over the 2.4/5 GHz frequency band.

In some demonstrative embodiments, wireless communication device 106 may communicate over the 60 GHz frequency band as part of any suitable Personal-Independent-Basic-Service-Set (PBSS), WLAN, WPAN, WVAN, piconet, and/or any other suitable network. In one example, wireless communication device 106 may perform the functionality of a control point, e.g., a suitable PBSS Control Point (PCP), or a coordinator, e.g., as defined by the IEEE 802.11 and/or WGA specifications. According to this example, wireless communication device 106 may control communications of wireless communication devices 102, 105 and/or other wireless communication devices over the 60 GHz frequency band. In another example, wireless communication device 106 may perform the functionality of a non-PCP station, while another device, e.g., wireless communication device 102, 105 or another wireless communication device, may perform the functionality of the control point.

In some demonstrative embodiments, wireless communication device 106 may be capable of coordinating, managing and/or performing a transfer of at least one communication session with another wireless communication device, e.g., device 102 and/or 105, between a first frequency band, e.g., the 60 GHz, 2.4 GHz or 5 Ghz frequency band, and a second frequency band, e.g., the 2.4 GHz, or 5 GHz or 60 Ghz frequency band, as described in detail below.

The term "wireless communication session" as used herein may refer one or more frames, including a common Traffic-Identifier (TID), transmitted between wireless communication devices of a wireless communication network, e.g., two devices belonging to the same BSS and/or PBSS.

The term "session transfer" as used herein may refer to transferring a session from the first frequency band to the second frequency band, e.g., from the 60 GHz frequency band to the 2.4/5 GHz frequency band, from the 5 GHz band to the 2.4 GHz band, from the 2.4/5 GHz band to the 60 GHz band, and/or any combination thereof.

In some demonstrative embodiments, wireless communication unit 108 may be capable of performing the session transfer through at least one of first and second session-transfer operation modes. In the first mode ("the non-transparent mode") session transfer between the first and second frequency bands may be handled above the Media Access Control (MAC) layer. In the second mode ("the transparent mode"), session transfer between the first and second frequency bands may be handled in the MAC layer such that the session transfer is "transparent" to higher layers, e.g., as described below. For example, wireless communication 108 may have the same Station Management Entity (SME) over both the first and second wireless communication frequency bands, e.g., if wireless communication unit supports the transparent session transfer mode.

In some demonstrative embodiments, wireless communication unit 108 may inform wireless communication device 102 of one or more session-transfer modes supported by wireless communication unit 108, e.g., using a multi-band Information Element (IE), as described below.

In one demonstrative embodiment, wireless communication unit 108 may use the same MAC address for identifying wireless communication unit 108 during the at least one session over both the first and second frequency bands, e.g., if the session transfer is performed through the transparent mode. The transparent mode may enable wireless communication unit 108 to transfer, for example, a session, e.g., a web browsing session, between the first and second wireless communication frequency bands, for example, without interrupting, restarting and/or disrupting the session at an application-level, e.g., since an Internet-Protocol (IP) layer may keep using the same MAC address after the transfer of the session.

In another demonstrative embodiment, wireless communication unit 108 may use a first MAC address to identify wireless communication unit 108 during the communication session over the first wireless communication frequency band, and to use a second MAC address, different from the first MAC address, to identify wireless communication unit 108 during, the session over the second wireless communication frequency band. According to this embodiment, wireless communication unit 108 may be capable of informing wireless communication device 102 of the second MAC address, for example, prior to transferring the session to the second frequency band, e.g., by including the second MAC address in a multi-band IE as described below.

In some demonstrative embodiments, wireless communication unit 108 may transmit a multi-band IE to wireless communication device 102 over the first wireless communication frequency band. The multi-band IE may include information relating to the operation and/or functionality of wireless communication unit 108 over the second wireless communication frequency band, e.g., as described below. For example, the multi-band IE may include information relating to the functionality and/or operation of wireless communication unit 108 over the 2.41/5 GHz frequency band, e.g., if wireless communication unit 108 transmits the multi-band IE in the 60 GHz frequency band and/or the multi-band. IE may include information relating to the functionality and/or operation of wireless communication unit 108 over the 60 GHz frequency band, e.g., if wireless communication unit 108 transmits the multi-band IE in the 2.4/5 GHz frequency band.

In some demonstrative embodiments, wireless communication unit 108 may transmit the multi-band IE as part of a session transfer frame, for example, a session transfer request frame and/or a session transfer response frame, e.g., as described below. Additionally or alternatively, wireless communication unit 108 may transmit the multi-band IE as part of any other suitable frame or transmission. For example, wireless communication unit 108 may transmit the multi-band IE as part of a beacon, an association response, a probe response, an announce frame, an information request, an information response, a service request, e.g., a mmWaveSTA service request, a service response, e.g., a mmWaveSTA service response, and the like, for example, if wireless communication unit 108 performs the functionality of a PCP/AP. Wireless communication unit 108 may transmit the multi-band IE as part of an association request, a re-association request, a probe request, an information request, an information response, a service request, e.g., a mmWaveSTA service request, a service response, e.g., a mmWaveSTA service response, and the like, for example, if wireless communication unit 108 performs the functionality of a non-PCP/non-AP.

In some demonstrative embodiments, wireless communication unit 108 may transmit more than one multi-band IE in a frame or transmission, e.g., if wireless communication unit 108 supports communication over more than two wireless communication frequency bands. For example, wireless communication unit may transmit a frame or transmission over a first wireless communication frequency band including a first multi-band IE corresponding to a second wireless communication frequency band and a second multi-band IE corresponding to a third wireless communication frequency band, e.g., it wireless communication unit supports communication over the first, second and third wireless communication frequency bands.

Figure 2:
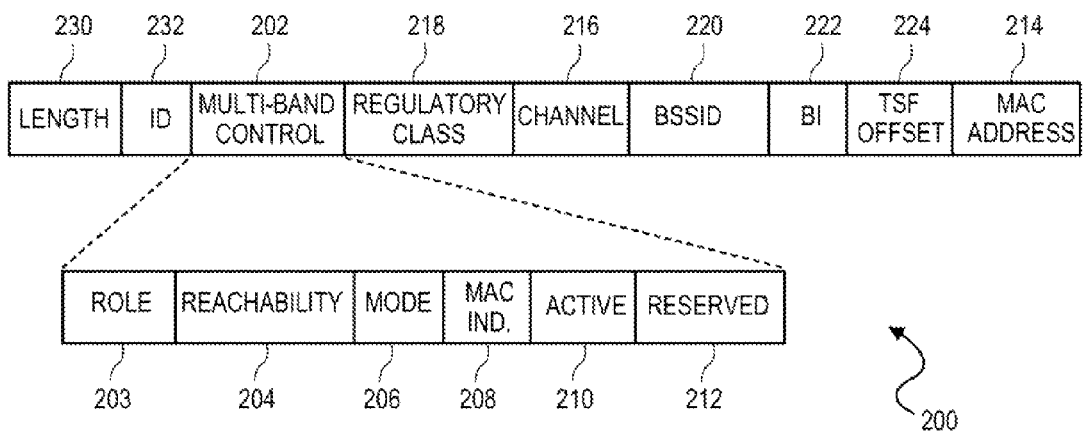
FIG. 2 is a schematic illustration of a multi-band information-element, in accordance with some demonstrative embodiments.

Reference is made to FIG. 2, which schematically illustrates a multi-band IE 200, in accordance with some demonstrative embodiments. In some demonstrative embodiments, multi-band IE 200 may be transmitted from a multi-band wireless communication unit, e.g., wireless communication unit 108 (FIG. 1), to a wireless communication device ("the recipient wireless communication device"), e.g., Wireless communication device 102 (FIG. 1). Multi-band IE 200 may be transmitted over a first wireless communication frequency band and may include information relating to the operation and/or functionality of the wireless communication unit over a second wireless communication frequency band.

In some demonstrative embodiments, multi-band IE 200 may include a multi-band control field 202, e.g., having a size of one octet (eight bits) or any other suitable size.

In some demonstrative embodiments, multi-band control field 202 may include a role field 203, e.g. having a size of one bit or any other suitable size, indicating whether or not the wireless communication unit operates as a controller over the second wireless communication frequency band. Wireless communication unit 108 (FIG. 1) may perform, for example, one or more roles over the first and/or second wireless communication frequency bands. For example, wireless communication unit 108 (FIG. 1) may perform the functionality of a PCP or a non-PCP station in the 60 GHz frequency band, and/or may perform as a non-AP station in the 2.4/5 GHz frequency band. In one embodiment, wireless communication unit 108 (FIG. 1) may set role field 203 of IE 200, which is transmitted over the first wireless communication frequency band, to a first value, e.g., zero, if wireless communication unit 108 (FIG. 1) operates as a non-PCP/AP station in the second wireless communication frequency band; and to a second value, e.g., one, otherwise.

In some demonstrative embodiments, multi-band control field 202 may include a reachability field 204, e.g., having a size of one bit or any other suitable size, indicating whether or not the wireless communication unit is able to receive frames from the recipient wireless communication device over the second wireless communication frequency band. For example, wireless communication unit 108 (FIG. 1) may use reachability field 204 of IE 200 which is transmitted over the first wireless communication frequency band, to inform wireless communication device 102 (FIG. 1) whether or not wireless communication unit 108 (FIG. 1) is able to receive transmissions from wireless communication device 102 (FIG. 1) over the second wireless communication frequency band. In one embodiment, wireless communication unit 108 (FIG. 1) may set reachability field 204 to a first value, e.g., zero, if wireless communication unit 108 (FIG. 1) is not able to receive transmissions from wireless communication device 102 (FIG. 1) over the second wireless communication frequency band; and to a second value, e.g., one, otherwise. The value of reachability field 204 may not be set by communication unit 108 (FIG. 1) and/or may be ignored by the recipient wireless communication device, e.g., if multi-band IE 200 is transmitted as part of a broadcast frame intended for a plurality of recipient wireless communication devices.

Wireless communication unit 108 (FIG. 1) may implement any suitable method and/or algorithm to determine whether or not wireless communication unit 108 (FIG. 1) is able to receive transmissions from wireless communication device 102 (FIG. 1) over the second wireless communication frequency band. In some demonstrative embodiments, upon receiving a multi-band IE from the recipient wireless communication device, wireless communication unit 108 (FIG. 1) may switch to a channel indicated by the received multi-band IE, and monitor the channel for frames from the recipient wireless communication device, for example, if a Beacon Interval (BI) length field of the received multi-band IE is greater than zero, e.g., as described below.

In some demonstrative embodiments, multi-band control field 202 may include a session-transfer mode field 206, e.g., having a size of one bit or any other suitable size, indicating at least one session transfer operation mode supported by the wireless communication device, e.g., the transparent session transfer mode and/or the non-transparent session transfer mode. In one embodiment, session transfer mode field 206 may have a first value, e.g., zero, indicating that wireless communication unit 108 (FIG. 1) supports the non-transparent session transfer mode; or a second value, e.g., one, indicating that wireless communication unit 108 (FIG. 1) supports both the transparent and the non-transparent session transfer modes.

In some demonstrative embodiments, multi-band IE 200 may optionally include an indication of a MAC address to be used for identifying the wireless communication unit over the second wireless communication frequency band. In one embodiment, multi-band IE 200 may optionally include a MAC address field 214, e.g., having a size of six octets or any other suitable size, to include the a MAC address to be used for identifying the wireless communication unit over the second wireless communication frequency band. In one embodiment, multi-band control field 202 may include a MAC-address indicator field 208, e.g., having a size of one bit or any other suitable size, indicating whether or not multi-band IE 200 includes MAC address field 214. For example, wireless communication unit 108 (FIG. 1) may set MAC-address indicator field 208 to a first value, e.g., one, to indicate that multi-band IE 200 includes MAC address field 214, for example, if wireless communication unit is to use the MAC address of field 214 to identify wireless communication unit 108 (FIG. 1) over the second wireless communication frequency band, e.g., if the non-transparent session transfer is performed; or a second value, e.g., zero, to indicate that multi-band IE 200 does not include MAC address field 214, for example, if wireless communication unit is to use the same MAC address, which is currently used over the first wireless communication frequency band, to identify wireless communication unit 108 (FIG. 1) over the second wireless communication frequency band, e.g., if the transparent session transfer is performed.

In some demonstrative embodiments, multi-band IE 200 may include a channel field 216, e.g., having a size of one octet or any other suitable size, indicating a channel, e.g., a channel number, to be used by the wireless communication device over the second wireless communication frequency band. In one embodiment, multi-band control field 202 may include a channel active field 210, e.g., having a size of one bit or any other suitable size, to indicate whether or not the wireless communication unit is operating ("active") on the channel indicated by field 216. For example, channel active field 210 may have a first value, e.g., one, indicating that the wireless communication unit is operating on the channel indicated by field 216; and a second value, e.g., zero, indicating that the wireless communication unit is not currently operating on the channel indicated by field 216.

In some demonstrative embodiments, multi-band control field 202 may include one or more additional fields 212 to transfer any other suitable information to the recipient wireless communication device.

In some demonstrative embodiments, multi-band IE 200 may include a regulatory class field 218, e.g., having a size of one octet or any other suitable size, to indicate a channel set of the second wireless communication frequency band, for which multi-band IE applies, e.g., based on suitable country, region and/or regulator domain requirements.

In some demonstrative embodiments, multi-band IE 200 may include a BSS identification (BSSID) field 220, e.g., having a size of six octets or any other suitable size, to indicate a BSSID of a BSS, which includes the wireless communication unit, on the second wireless communication frequency band. For example, BSSID field 220 may include a BSSID of a network, e.g., a BSS or PBSS, with which wireless communication unit 108 (FIG. 1) is associated on the channel indicated by field 216, e.g., if role field 202 is set to zero. BSSID field 220 may include a BSSID used by wireless communication unit 108 (FIG. 1) on the channel indicated by field 216, e.g., if role field 202 is set to one. BSSID field 220 may be reserved and/or ignored, e.g., if channel active field 210 is set to zero. Channel active field 210 may be is set to one and BSSID field 220 may be set to zero, e.g., to indicate that the wireless communication unit is not associated on the channel indicated by field 216.

In some demonstrative embodiments, multi-band IE 200 may include a BI field 222, e.g. having a size of two octets or any other suitable size, to indicate a BI length of the network over the second wireless communication frequency band. For example, BI field 222 may include a BI length used by the wireless communication unit while operating on the channel indicated by field. 216, e.g., if role field 203 is set to one. BI field 222 may include to an observed BE of a PBSS or BSS with which wireless communication unit 108 (FIG. 1) is associated on the channel indicated by field 216, e.g., if role field 203 is set to zero. BI field 222 may include the value zero, e.g., if the wireless communication unit is not a member of a BSS or PBSS on the channel indicated by field 216.

In some demonstrative embodiments, multi-band IE 200 may include a Timing Synchronization Function (TSF) offset field 224, e.g., having a size of eight octets or any other suitable size, indicating, a TSF offset between a first network, e.g., a BSS or PBSS, used by the wireless communication unit on the first wireless communication frequency band, and a second network, e.g., a BSS or PBSS, used by the wireless communication unit on the second wireless communication frequency band. For example, if the wireless communication unit is a member of a PBSS or BSS on both the channel indicated by field 216, and the channel over which multi-band IE 200 is transmitted, then TSF Offset field 224 may include a time offset of the TSF of the first network relative to the TSF of the first network, e.g., in the form of a two's complement integer in microsecond units. TSF offset field 224 may be set to zero, e.g., if the wireless communication unit is not a member of a BSS or PBSS on both the first and second wireless communication frequency bands.

In some demonstrative embodiments, multi-band IE 200 may also include an element identifier (ID) 230, e.g., having a size of one octet, identifying, multi-band IE 200; and a length field 232, e.g., having a size of one octet, indicating a length of multi-band IE 200.

Referring back to FIG. 1, in some demonstrative embodiments, wireless communication unit 108 may coordinate with wireless communication device 102 a session transfer timeout period corresponding to the at least one communication session between wireless communication devices 106 and 102; and if wireless communication unit 108 cannot communicate with wireless communication device 102 over the first wireless communication frequency band for the session transfer timeout period, wireless communication unit 108 may transfer the communication session from the first wireless communication frequency band to the second wireless communication frequency band, e.g., as described below.

In some demonstrative embodiments, wireless communication unit 108 may transmit to wireless communication device 102 a request frame including a timeout field indicating the timeout period and at least one control field identifying at least one requested communication session, e.g., as described below.

In some demonstrative embodiments, wireless communication unit 108 may transmit the session-transfer frame after receiving over the first wireless communication frequency band a multi-band IE from wireless communication device 102, e.g., multi-band IE 200 as described above with reference to FIG. 2, indicating that wireless communication device 102 is able to receive frames from wireless communication unit 108 over the second wireless communication frequency band.

In some demonstrative embodiments, wireless communication unit 108 may receive a response frame from wireless communication device 102 identifying at least one acknowledged session of the at least one requested communication session. Based on the response frame, wireless communication unit 108 may transfer only the at least one acknowledged session from the first wireless communication frequency band to the second wireless communication frequency band, e.g., as described below.

In some demonstrative embodiments, if wireless communication unit 108 is a member a network, e.g., a PBSS or a BSS, then when wireless communication unit 108 transmits a session transfer request and/or response frame over a certain channel, wireless communication unit 108 may include in the frame supported rates and/or supported channels which were transmitted during a most recent successful association exchange in a frequency band indicated by a most recently transmitted, multi-band IE, which was transmitted over the certain channel.

In some demonstrative embodiments, wireless communication unit 108 may inform other wireless communication devices in the network over the first wireless communication frequency band, e.g., wireless communication device 105, that wireless communication unit 108 intends to perform or has performed the session transfer. For example, wireless communication unit may transmit a channel switch announcement frame or an extended channel switch announcement frame, e.g., as defined by the IEEE 802.11 specification, over the first wireless communication frequency band. After performing the session transfer, wireless communication unit 108 (FIG. 1) may follow any suitable medium access rules defined over the second wireless communication frequency band.

Figure 3:
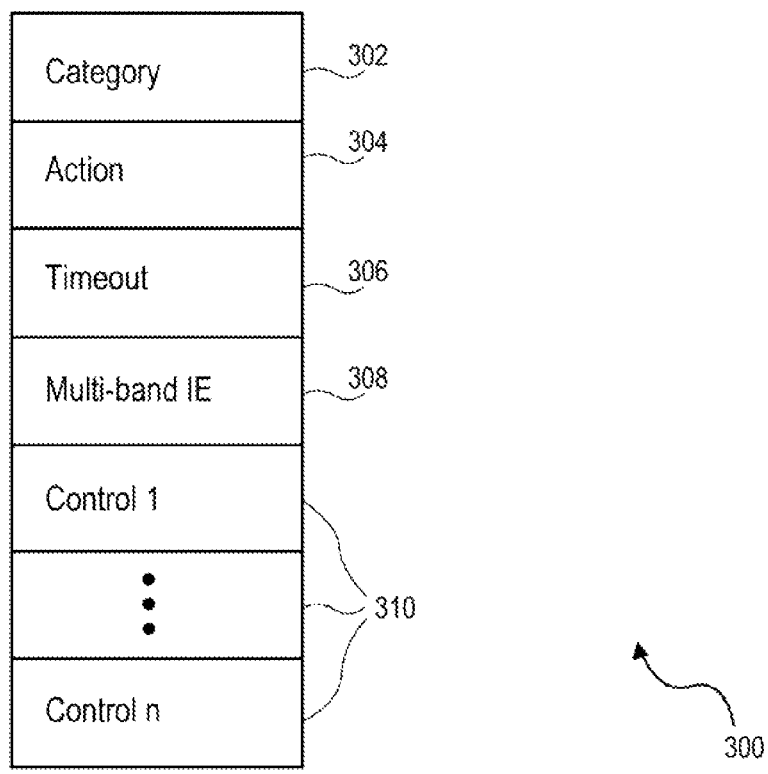
FIG. 3 is a schematic illustration of a session transfer request frame, in accordance with some demonstrative embodiments.

Reference is now made to FIG. 3, which schematically illustrates a session transfer request frame 300, in accordance with some demonstrative embodiments. In one embodiment, session transfer request frame 300 may be transmitted from a wireless communication device, e.g., wireless communication device 106 (FIG. 1) or a wireless communication unit, e.g., wireless communication unit 108 (FIG. 1), to a recipient wireless communication device, e.g., wireless communication device 102 (FIG. 1), for example, to request to coordinate the session transfer of at least one session between wireless communication device 106 (FIG. 1) and wireless communication device 102 (FIG. 1) from the first frequency band to the second frequency band and/or vice versa.

In some demonstrative embodiments, request frame 300 may include one or more fields in accordance with any suitable specification, e.g., a category field 302 and/or an action field 304 in accordance with the IEEE 802.11 specification. For example, category field 302 may have a value indicating that frame 300 relates to the session transfer operation; and/or action field 304 may have a value indicating that frame 300 is session transfer request frame.

In some demonstrative embodiments, request frame 300 may include a Link Lost Timeout (LLT) field 306, e.g., having a size of 32 bits or any other suitable size, indicating a LLT period for wireless communication unit 108 and wireless communication device 102 to wait, if wireless communication unit 108 and wireless communication device 102 cannot communicate with wireless communication device 102 over the first wireless communication frequency band, prior to transferring the communication session from the first wireless communication frequency band to the second wireless communication frequency band. For example, LLT field 306 may indicate a maximal time period, e.g., in microseconds, for wireless communication unit 108 (FIG. 1) to wait from a last time a message, e.g., a MAC Protocol data unit (MPDU), was received by wireless communication unit 108 (FIG. 1) from wireless communication device 102 (FIG. 1) over the first frequency band, prior to performing the session transfer. Wireless communication unit 108 (FIG. 1) may decrement the LLT value, for example, during periods of time that wireless communication unit 108 (FIG. 1) expects to communicate, but is not able to communicate, with wireless communication device 102 (FIG. 1). Wireless communication unit 108 (FIG. 1) may reset the LLT value to the initial LLT value, e.g., otherwise.

In some demonstrative embodiments, request frame 300 may include a multi-band IE corresponding, to the second wireless communication frequency band, e.g., multi-band IE 200 as described above with reference to FIG. 2.

In some demonstrative embodiments, request frame 300 may include one or more, e.g., between one and sixteen or any other suitable number, session control fields 310. In some demonstrative embodiments, each session control field 310 may correspond to a session between wireless communication unit 108 (FIG. 1) and wireless communication device 102 (FIG. 1).

In some demonstrative embodiments, session control field 310 may include a session indication field 314 to indicate the session corresponding to session control field 310. Session indication field 314 may include, for example, a traffic identification (TID) of the session, e.g., in accordance with the IEEE 802.11 specification, or any other suitable indicator.

In some demonstrative embodiments, session control field 310 may include a control field 312 indicating whether session transfer is requested to be enabled or disabled for the session indicated by field 314. For example, control filed 312 may be set to a first value, e.g., one, to indicate that session transfer is requested to be enabled; and to a second value, e.g., zero, to indicate that session transfer is to be disabled.

Figure 4:
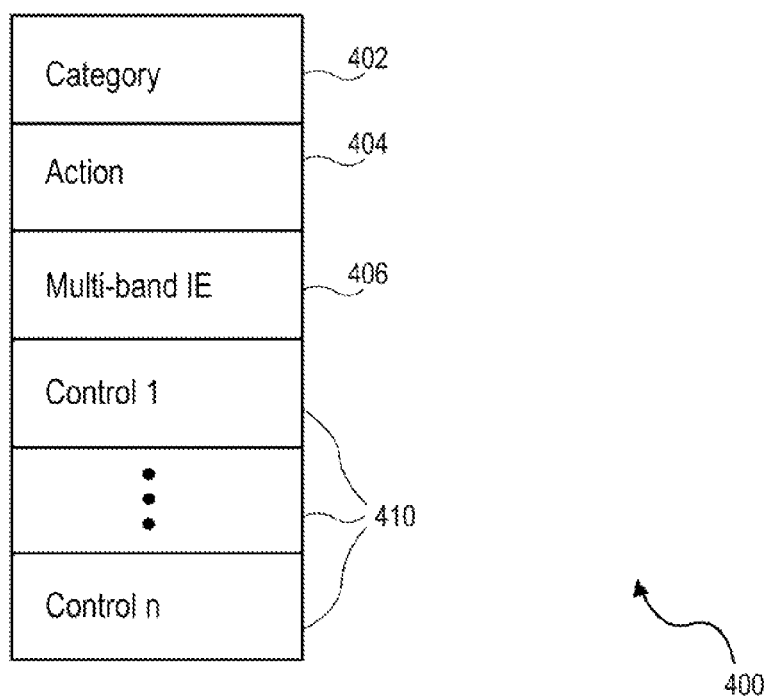
FIG. 4 is a schematic illustration of a session transfer response frame, in accordance with some demonstrative embodiments.

Reference is now made to FIG. 4, which schematically illustrates a session transfer response frame 400, in accordance with some demonstrative embodiments. In one embodiment, session transfer response frame 400 may be transmitted from a wireless communication device ("the responding device"), e.g., wireless communication device 102 (FIG. 1), in response to a session transfer request frame, e.g., frame 300 (FIG. 3), from another wireless communication device ("the requesting device"), e.g., wireless communication device 106 (FIG. 1).

In some demonstrative embodiments, response frame 400 may include one or more fields in accordance with any suitable specification, e.g., a category field 402 and/or an action field 404 in accordance with the IEEE 802.11 specification. For example, category field 402 may have a value indicating that frame 400 relates to the session transfer operation; and/or action field 404 may have a value indicating that frame 400 is session transfer response frame.

In some demonstrative embodiments, response frame 400 may include a multi-band IE 406 corresponding to the operation of the responding device on the second wireless communication frequency band, e.g., multi-band IE 200 as described above with reference to FIG. 2.

In some demonstrative embodiments, response frame 400 may include one or more, e.g., between one and sixteen or any other suitable number, session control fields 410 corresponding to the session control fields 310 (FIG. 3) of the request frame 300 (FIG. 3).

In some demonstrative embodiments, session control field 410 may include a session indication field 414 to indicate the session corresponding to session control field 410. Session indication field 414 may include, for example, a traffic identification (TID) of the session, e.g., in accordance with the IEEE 802.11 specification, or any other suitable indicator.

In some demonstrative embodiments, session control field 410 may include a control field 412 indicating whether session transfer is acknowledged to be enabled or disabled for the session indicated by field 414. For example, control filed 412 may be set to a first value, e.g., one, to indicate that session transfer is acknowledged to be enabled; and to a second value, e.g., zero, to indicate that session transfer is to be disabled.

Figure 5:
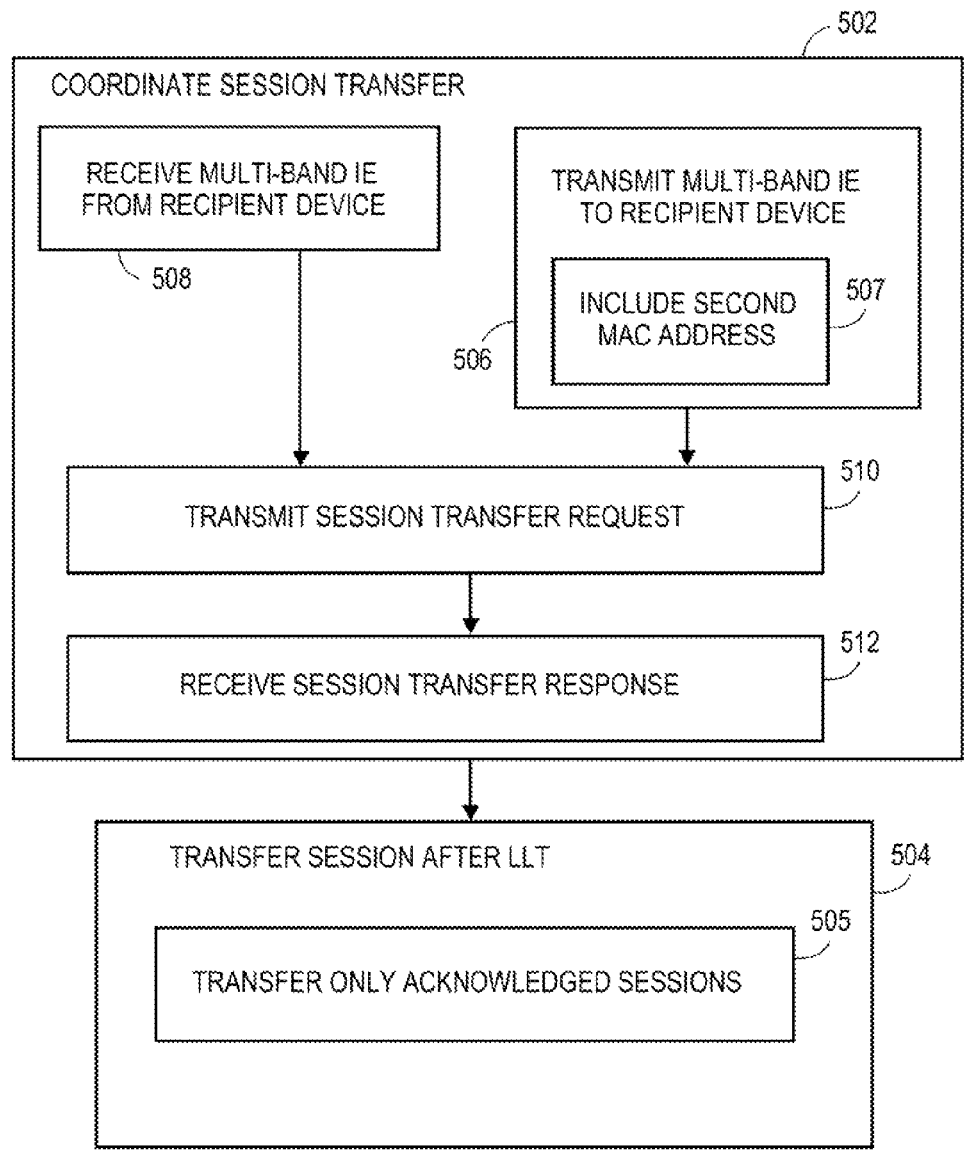
FIG. 5 is a schematic flow-chart illustration of a method of transferring a wireless communication session between first and second wireless communication frequency bands, in accordance with some demonstrative embodiments.

Reference is now made to FIG. 5, which schematically illustrates a method of transferring a wireless communication session between first and second wireless communication frequency bands, in accordance with some demonstrative embodiments. In one embodiment, one or more operations of the method of FIG. 5 may be performed by one or more elements of a system, e.g., system 100 (FIG. 1), for example, one or more wireless communication devices, e.g., wireless communication devices 102 and/or 106 (FIG. 1), and/or a wireless communication unit, e.g., wireless communication unit 108 (FIG. 1).

As indicated at block 502, the method may include coordinating a session transfer timeout period between first and second multiband wireless communication devices capable of communicating over at least first and second wireless communication frequency bands, wherein the session transfer timeout period corresponds to at least one communication session between the first and second wireless communication devices. For example, wireless communication unit 108 (FIG. 1) may coordinate a LLT period with wireless communication device 102 (FIG. 1), e.g., as described herein.

As indicated at block 504, the method may include transferring the at least one communication session from the first wireless communication frequency band to the second wireless communication frequency band, e.g., if the first wireless communication unit cannot communicate with the second wireless communication device over the first wireless communication frequency band for a time period of at least the session transfer timeout period. For example, wireless communication unit 108 (FIG. 1) and wireless communication device 102 (FIG. 1) may transfer the at least one session from the 2.4/5 GHz frequency band to the 60 GHz frequency band and/or vice versa, e.g., as described herein.

As indicated at block 510, the method may include transmitting a request frame from the first wireless communication device to the second wireless communication device. The request frame may include a timeout field indicating the timeout period and at least one control field identifying at least one requested communication session. For example, wireless communication unit 108 (FIG. 1) may transmit request frame 300 (FIG. 3) to wireless communication device 102 (FIG. 1), e.g., as described above.

As indicated at block 512, the method may include receiving a response from the second wireless communication device.

In some demonstrative embodiments, the response may include a response frame identifying at least one acknowledged session of the at least one requested communication session. For example, wireless communication unit 108 (FIG. 1) may receive response frame 400 (FIG. 4) from wireless communication device 102 (FIG. 1), e.g., as described above. According to these embodiments, as indicated at block 505, transferring the at least one session from the first wireless communication frequency band to the second wireless communication frequency band may include transferring only the at least one acknowledged session from the first wireless communication frequency band to the second wireless communication frequency band. For example, wireless communication unit 108 (FIG. 1) and wireless communication device 102 (FIG. 1) may transfer the at least one acknowledged session from the 2.4/5 GHz frequency band to the 60 GHz frequency band and/or vice versa, e.g., as described herein.

As indicated at block 506, the method may include transmitting a multi-band IE from the first wireless communication device to the second wireless communication device over the first wireless communication frequency band. The multi-band IE may include, for example, a role field indicating whether or not the first wireless communication device operates as a controller over the second wireless communication frequency band; and/or a reachability field indicating whether or not the first wireless communication device is able to receive frames from the second wireless communication device over the second wireless communication frequency band. For example, wireless communication unit 108 (FIG. 1) may transmit multi-band IE 200 (FIG. 2) to wireless communication device 102 (FIG. 1) over the first wireless communication frequency band, wherein the transmitted multi-band IE includes information corresponding to the operation and/or functionality of wireless communication unit 108 (FIG. 1) over the second wireless communication frequency band, e.g., as described above. The first wireless communication device may transmit the multi-band IE as part of the request frame and/or as part of any other suitable frame or transmission, e.g., as described above.

As indicated at block 508, the method may include receiving from the second wireless communication device a multi-band IE, e.g. over the first wireless communication frequency band, wherein the received multi-band IE includes information corresponding to the operation and/or functionality of the second wireless communication device over the second wireless communication frequency band. For example, wireless communication unit 108 (FIG. 1) may receive multi-band IE 200 (FIG. 2) from wireless communication device 102 (FIG. 1) over the first wireless communication frequency band, wherein the received multi-band IE includes information corresponding to the operation and/or functionality of wireless communication device 102 (FIG. 1) over the second wireless communication frequency band, e.g., as described above. The first wireless communication device may receive the multi-band IE as part of the response frame and/or as part of any other suitable frame or transmission, e.g., as described above.

In some demonstrative embodiments, the method may include using a first MAC address to identify the first wireless communication device during the at least one session over the first second wireless communication frequency band; and using a second MAC, different from the first media-access-control address, to identify the first wireless communication device during the at least one session over the second wireless communication frequency band.

For example, wireless communication unit 108 (FIG. 1) may perform a non-transparent session transfer by using a first MAC address for communicating with wireless communication device 102 (FIG. 1) over the first wireless communication frequency band, e.g., for transmitting the multi-band IE and/or the session transfer request frame; and a second MAC address, different from the first MAC address, for communicating with wireless communication device 102 (FIG. 1) over the second wireless communication frequency band, e.g., as described above. According to these embodiments, as indicated at block 505, the first wireless communication device may transmit the multi-band IE to the second wireless communication device, wherein the multi-band IE includes the second MAC address. For example, wireless communication unit 108 (FIG. 1) may transmit multi-band IE 200 (FIG. 1) including the second MAC address in field 214 (FIG. 2), e.g., as described above.

In some demonstrative embodiments, the method may include using a first MAC address to identify the first wireless communication device during the at least one session over the first second wireless communication frequency band, and using the first MAC address to identify the first wireless communication device during the at least one session over the second wireless communication frequency band. For example, wireless communication unit 108 (FIG. 1) may perform a transparent session transfer by using the same MAC address for communicating with wireless communication device 102 (FIG. 1) over both the first and second wireless communication frequency band, e.g., as described above.

Figure 6:
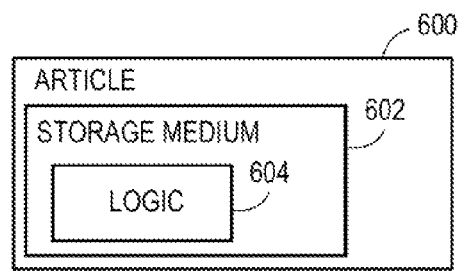
FIG. 6 is a schematic block diagram illustration of an article of manufacture, in accordance with some demonstrative embodiments.

Reference is made to FIG. 6, which schematically illustrates an article of manufacture 400, in accordance with some demonstrative embodiments. Article 600 may include a machine-readable storage medium 602 to store logic 604, which may be used, for example, to perform at least part of the functionality of wireless communication unit 108 (FIG. 1), wireless communication device 102 (FIG. 1), and/or wireless communication device 105 (FIG. 1); and/or to perform one or more operations of the method of FIG. 5.

In some demonstrative embodiments, article 600 and/or machine-readable storage medium 602 may include one or more types of computer-readable storage media capable of storing data, including volatile memory, non-volatile memory, removable or non-removable memory, erasable or non-erasable memory, writeable or re-writeable memory, and the like. For example, machine-readable storage medium 602 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like. The computer-readable storage media may include any suitable media involved with downloading or transferring a computer program from a remote computer to a requesting computer carried by program requesting data signals embodied in a carrier wave or other propagation medium through a communication link, e.g., a modem, radio or network connection.

In some demonstrative embodiments, logic 604 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using an suitable combination of hardware, software, firmware, and the like.

In some demonstrative embodiments, logic 604 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, such as C, C++, Java, BASIC, Matlab, Pascal, Visual BASIC, assembly language, machine code, and the like.

Functions, operations, components and/or features described herein with reference to one or more embodiments, may be combined with, or may be utilized in combination with, one or more other functions, operations, components and/or features described herein with reference to one or more other embodiments, or vice versa.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

What is claimed is:

1. A first device for wireless communication, comprising:
a processor, a memory, an input, an output, an antenna, and a wireless communication unit, the first device including a plurality of media-access-control (MAC) addresses and being configured to communicate over first and second wireless communication frequency bands, wherein the first device is to:
transmit, over the first wireless communication frequency band to a second device using a first one of the plurality of MAC addresses, an information element (IE) having (a) a MAC address indicator field to identify whether the IE includes a MAC address field and (b) a timing synchronization function (TSF) offset field to identify a TSF offset value between the first and second wireless communication frequency bands;
select a second one of the plurality of MAC addresses associated with the MAC address field for identifying the wireless communication unit over the second wireless communication frequency band during a session with the second device when the MAC address indicator field has a first value; and
use the first one of the plurality of MAC addresses for identifying the wireless communication unit over the second wireless communication frequency band during the session when the MAC address indicator field has a second value.

2. The first device of claim 1, further including transferring the session by transmitting a session-transfer request to the second device and receiving a session-transfer response from the second device.

3. The first device of claim 1, further including receiving a session-transfer request from the second device and transmitting a session-transfer response to the second device.

4. The first device of claim 1, wherein the first wireless communication frequency band includes one frequency band selected from at least one of a 60 gigahertz frequency band, a 2.4 gigahertz frequency band, or a 5 gigahertz frequency band, and wherein the second wireless communication frequency band includes another frequency band selected from at least one of the 60 gigahertz frequency band, the 2.4 gigahertz frequency band, or the 5 gigahertz frequency band.

5. The first device of claim 1, wherein the first device includes at least one of: 1) a keyboard, 2) a screen, or 3) an audio speaker.

6. The first device of claim 1, wherein the first one of the plurality of MAC addresses is different than the second one of the plurality of MAC addresses.

7. A method of wireless communication, comprising:
   transmitting, from a first wireless communication device over a first wireless communication frequency band to a second wireless communication device using a first one of a plurality media-access-control (MAC) addresses, an information element (IE) having (a) a MAC address indicator field to identify whether the IE includes a MAC address field and (b) a timing synchronization function (TSF) offset field to identify a TSF offset value between the first wireless communication frequency band and a second wireless communication frequency band;
   selecting a second one of the plurality of MAC addresses associated with the MAC address field to identify a wireless communication unit of the first wireless communication device over the second wireless communication frequency band during a session with the second wireless communication device when the MAC address indicator field has a first value; and
   using the first one of the plurality of MAC addresses to identify the wireless communication unit over the second wireless communication frequency band during the session when the MAC address indicator field has a second value.

8. The method of claim 7, further including transferring the session by transmitting a session-transfer request to the second wireless communication device and receiving a session-transfer response from the second wireless communication device.

9. The method of claim 7, further including receiving a session-transfer request from the second wireless communication device and transmitting a session-transfer response to the second wireless communication device.

10. The method of claim 7, wherein the first wireless communication frequency band includes one frequency band selected from at least one of a 60 gigahertz frequency band, a 2.4 gigahertz frequency band, or a 5 gigahertz frequency band, and wherein the second wireless communication frequency band includes another frequency band selected from at least one of the 60 gigahertz frequency band, the 2.4 gigahertz frequency band, or the 5 gigahertz frequency band.

11. The method of claim 7, wherein the first one of the plurality of MAC addresses is different than the second one of the plurality of MAC addresses.

12. A non-transitory machine-readable storage medium having instructions stored thereon, wherein the instructions, when executed by a machine, cause the machine to perform operations comprising:
   transmitting, from a first wireless communication device over a first wireless communication frequency band to a second wireless communication device using a first one of a plurality of media-access-control (MAC) addresses, an information element (IE) having (a) a MAC address indicator field to identify whether the IE includes a MAC address field and (b) a timing synchronization function (TSF) offset field to identify a TSF offset value between the first communication frequency band and a second wireless communication frequency band;
   selecting, by the first wireless communication device, a second one of a plurality of MAC addresses associated with the MAC address field for identifying a wireless communication unit of the second wireless communication device over the second wireless communication frequency band during a session with the second wireless communication device when the MAC address indicator field has a first value; and
   using the first one of the plurality of MAC addresses for identifying the wireless communication unit of the second wireless communication device over the second wireless communication frequency band during the session when the MAC address indicator field has a second value.

13. The medium of claim 12, further including transferring the session by transmitting a request to the second wireless communication device and receiving a response from the second wireless communication device.

14. The medium of claim 12, further including receiving a request from the second wireless communication device and transmitting a response to the second wireless communication device.

15. The medium of claim 12, wherein the first wireless communication frequency band includes at least one of a 60 gigahertz frequency band, a 2.4 gigahertz frequency band, or a 5 gigahertz frequency band, and wherein the second wireless communication frequency band includes another of the 60 gigahertz frequency band, the 2.4 gigahertz frequency band, or the 5 gigahertz frequency band.

16. The medium of claim 12, wherein the first one of the plurality of MAC addresses is different than the second one of the plurality of MAC addresses.

* * * * *